(12) United States Patent
Lakhzouri et al.

(10) Patent No.: US 8,599,812 B2
(45) Date of Patent: Dec. 3, 2013

(54) ENCODED WIRELESS DATA DELIVERY IN A WLAN POSITIONING SYSTEM

(75) Inventors: Abdelmonaem Lakhzouri, Tampere (FI); Florean Curticapean, Tampere (FI)

(73) Assignee: QUALCOMM Incorporated, San Diego, CA (US)

(*) Notice: Subject to any disclaimer, the term of this patent is extended or adjusted under 35 U.S.C. 154(b) by 95 days.

(21) Appl. No.: 13/430,532

(22) Filed: Mar. 26, 2012

(65) Prior Publication Data

US 2013/0250851 A1 Sep. 26, 2013

(51) Int. Cl.
H04W 4/00 (2009.01)
(52) U.S. Cl.
USPC ............ 370/338; 370/461; 370/252; 370/235
(58) Field of Classification Search
USPC ........................................................ 370/328
See application file for complete search history.

(56) References Cited

U.S. PATENT DOCUMENTS

| | | | |
|---|---|---|---|
| 7,023,934 B2 * | 4/2006 | Tran et al. .................... 375/341 |
| 7,245,900 B1 * | 7/2007 | Lamb et al. ................ 455/404.1 |
| 7,475,273 B2 * | 1/2009 | Gredone et al. ............. 713/600 |
| 7,821,986 B2 * | 10/2010 | Thomson et al. ............ 370/328 |
| 8,228,848 B2 * | 7/2012 | Vos et al. ..................... 370/328 |
| 8,379,512 B2 * | 2/2013 | Gogic et al. ................. 370/216 |
| 8,447,326 B2 * | 5/2013 | Huang et al. .............. 455/456.1 |
| 2004/0162896 A1 | 8/2004 | Cen et al. |
| 2005/0090266 A1 * | 4/2005 | Sheynblat .................. 455/456.1 |
| 2006/0200843 A1 * | 9/2006 | Morgan et al. .................. 725/80 |
| 2008/0176583 A1 | 7/2008 | Brachet et al. |
| 2010/0178934 A1 | 7/2010 | Moeglein et al. |
| 2010/0195566 A1 * | 8/2010 | Krishnamurthy et al. ..... 370/328 |
| 2011/0176523 A1 * | 7/2011 | Huang et al. ................. 370/338 |
| 2011/0176532 A1 * | 7/2011 | Franceschini et al. ........ 370/342 |
| 2011/0199916 A1 * | 8/2011 | Garrett et al. ................. 370/252 |
| 2011/0257923 A1 | 10/2011 | Boulton |
| 2012/0087315 A1 * | 4/2012 | Sivaprakasam ............... 370/329 |
| 2012/0115508 A1 * | 5/2012 | Moeglein et al. .......... 455/456.1 |
| 2013/0165142 A1 * | 6/2013 | Huang ....................... 455/456.1 |
| 2013/0165150 A1 * | 6/2013 | Cho et al. .................. 455/456.2 |
| 2013/0196686 A1 * | 8/2013 | Huang et al. .............. 455/456.1 |

FOREIGN PATENT DOCUMENTS

EP 2362702 A1 8/2011
WO 2005004527 1/2005

OTHER PUBLICATIONS

International Search Report and Written Opinion—PCT/US2013/032935—ISA/EPO—Jun. 6, 2013.

* cited by examiner

*Primary Examiner* — Ian N Moore
*Assistant Examiner* — Lakeram Jangbahadur
(74) *Attorney, Agent, or Firm* — Mahamedi Paradice Kreisman LLP

(57) ABSTRACT

A mobile device transmits to a server a request for information regarding access points in a wireless network. In response to the request, the mobile device receives encoded access point identifiers for a plurality of access points. The encoded access point identifiers include a reference identifier that has a number of groups of bits. The encoded access point identifiers also include encoding masks for respective access point identifiers, wherein a respective encoding mask identifies groups of bits for the respective access point identifier that are identical to corresponding groups of bits for the reference identifier. The encoded access point identifiers further include, for the respective access point identifiers, groups of bits that are not identical to the corresponding groups of bits for the reference identifier. The mobile device decodes at least some of the encoded access point identifiers.

29 Claims, 7 Drawing Sheets

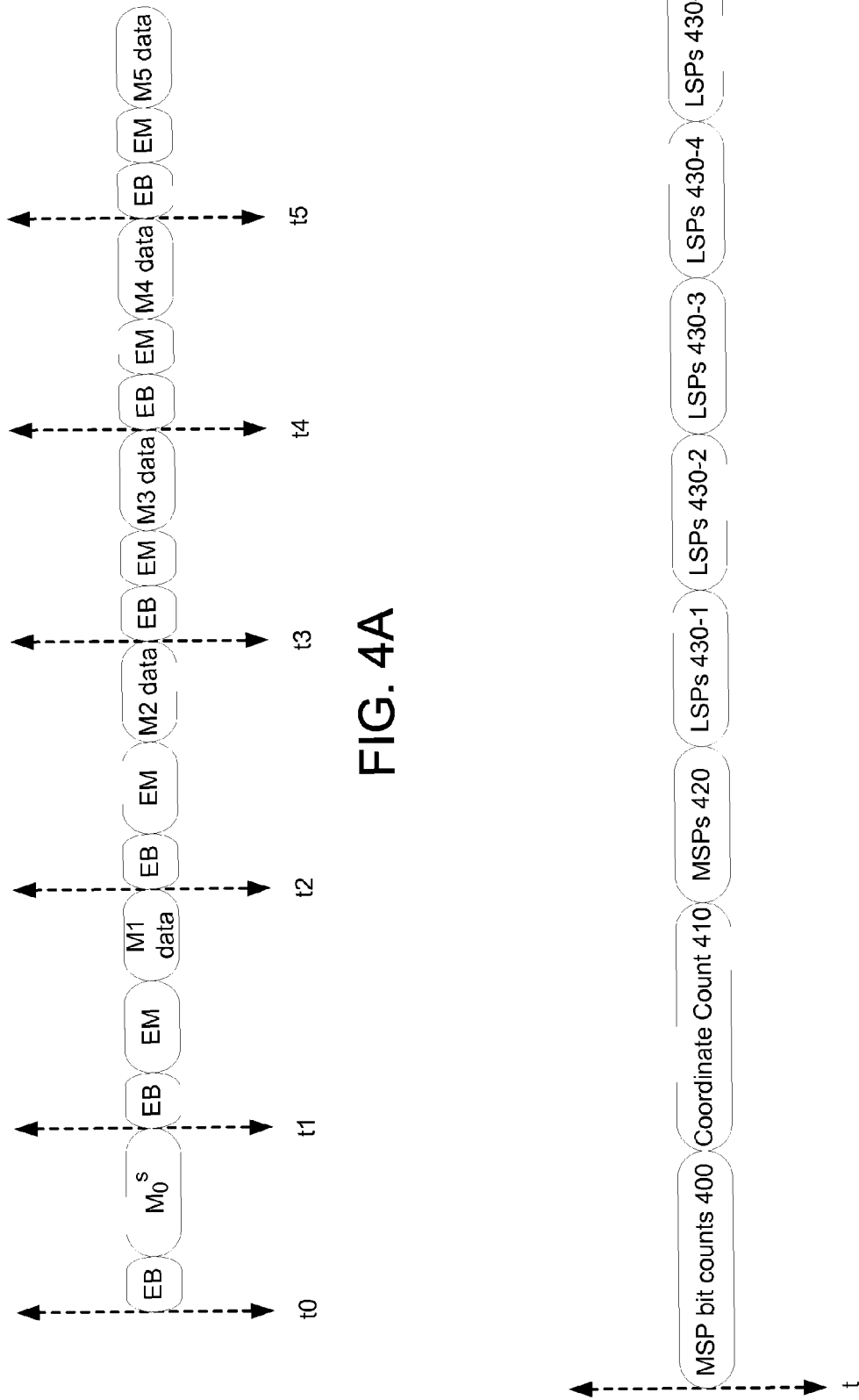

ENCODED WIRELESS DATA DELIVERY IN A WLAN POSITIONING SYSTEM

RELATED APPLICATION

This application is related to U.S. patent application Ser. No. 13/357,277, entitled "Dynamic Data Retrieval in a WLAN Positioning System," filed Jan. 24, 2012, which is incorporated by reference herein in its entirety.

TECHNICAL FIELD

The present embodiments relate generally to wireless networks, and specifically to encoding information (e.g., identifiers and locations) for wireless access points.

BACKGROUND OF RELATED ART

Modern navigation systems frequently use a global navigation satellite system (GNSS) for position determination. However, the recent proliferation of Wi-Fi access points in wireless local area networks (WLANs) has made it possible for navigation systems to use these access points for position determination, especially in areas where there is a large concentration of active Wi-Fi access points (e.g., urban cores, shopping centers, office buildings, and so on). Indeed, WLAN positioning systems can be advantageous over GNSS in certain environments because of GNSS signal coverage limitations. For example, while GNSS signals may not be readily detectable inside structures such as shopping malls and office buildings (e.g., due to signal attenuation and/or multipath effects), wireless signals generated by Wi-Fi access points located within such structures are typically detectable by each other and by Wi-Fi enabled mobile devices within range of such access points.

For WLAN positioning systems, the locations of the Wi-Fi access points are used as reference points from which well-known trilateration techniques can determine the location of a mobile device (e.g., a Wi-Fi-enabled cell phone, laptop, or tablet computer). More specifically, the mobile device can use the received signal strength indicators (RSSI) associated with a number of visible access points as indications of the distances between the mobile device and each of the detected access points, where a stronger RSSI means that the mobile device is closer to the access point and a weaker RSSI means that the mobile device is further from the access point. The mobile device can also use the round trip time (RTT) of signals transmitted to and from the access points to estimate the distances between the mobile device and the access points. Once these distances are estimated, the location of the mobile device relative to the access points can be determined using trilateration techniques.

Whether using RSSI or RTT techniques to determine the distances between the mobile device and the visible Wi-Fi access points, the precise geographic location (e.g., latitude and longitude) of at least three such access points needs to be known to establish the absolute location of the mobile device. A number of online location databases can be used to determine the locations of large numbers of actively deployed Wi-Fi access points according to their unique basic service set identifier (BSSID) values. For example, companies including Google, Skyhook, Devicescape, and WiGLE have built access point location servers (APLS) of BSSID values and the geographic locations of their corresponding access points. Typically, the location of a particular access point is first determined either manually (e.g., using electronic mapping) or using the access point's embedded GNSS capabilities, and then the access point's location is uploaded (along with the access point's BSSID value) to the access point location server. Thereafter, a mobile device can determine the precise location of a selected visible access point by obtaining the BSSID from the access point, providing the BSSID to the location server, and then receiving the access point's location coordinates from the location server.

Once the location coordinates of 3 visible access points are known to the mobile device, positioning software operating on the mobile device can use the estimated distances between the mobile device and each of the 3 access points (e.g., calculated using ranging operations involving RTT and/or RSSI techniques) to calculate the mobile device's location coordinates using trilateration techniques. It is noted that to continually provide accurate location information to mobile devices, the access point location servers are frequently updated because of the relatively transient nature of Wi-Fi access points (e.g., access points are often moved, serviced, and/or decommissioned).

The increasing number of wireless access points and the increasingly large number of client mobile devices querying the APLS for access point information result in high network traffic and an increased load on the APLS. Thus, there is a need to efficiently store and transmit information regarding access points.

BRIEF DESCRIPTION OF THE DRAWINGS

The present embodiments are illustrated by way of example and are not intended to be limited by the figures of the accompanying drawings. Like numbers reference like elements throughout the drawings and specification.

FIG. 4A illustrates transmission of encoded access point identifiers in accordance with some embodiments.

FIG. 4B illustrates transmission of encoded access point locations in accordance with some embodiments.

DETAILED DESCRIPTION

Figure 1:
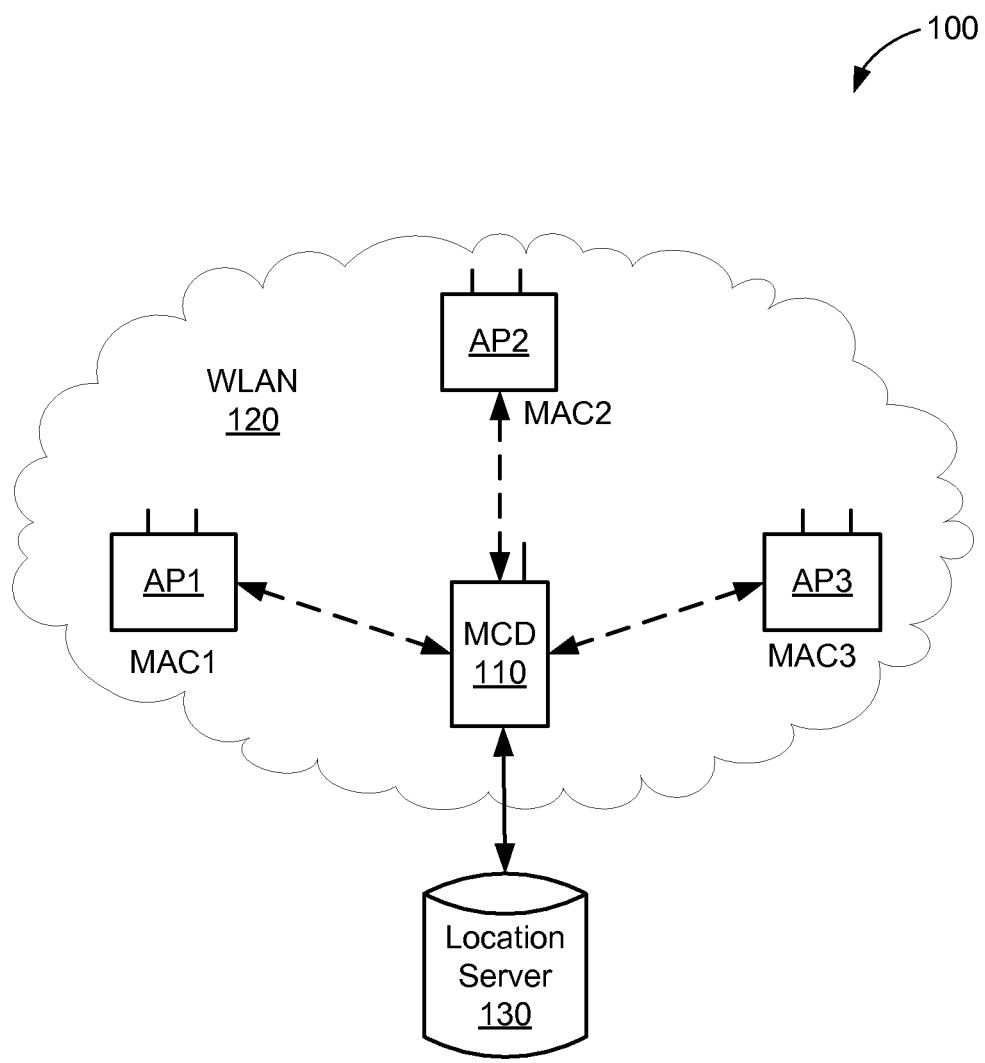
FIG. 1 is a block diagram of a WLAN positioning system within which the present embodiments can be implemented.

In accordance with the present embodiments, accurate position capability can be provided using a Wireless Local Area Network (WLAN). As used herein, the term WLAN can include communications governed by the IEEE 802.11 standards, Bluetooth, HiperLAN (a set of wireless standards, comparable to the IEEE 802.11 standards, used primarily in Europe), and other technologies having relatively short radio propagation range. In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

In accordance with the present embodiments, systems and methods are disclosed for encoding information regarding access points, transmitting the encoded information from a server (e.g., an access point location server (APLS)) to a mobile device, and decoding the information at the mobile device. The access point information is used, for example, in a wireless local area network (WLAN) positioning system to calculate the geographic location of mobile devices. The WLAN positioning system includes a plurality of Wi-Fi access points and an APLS that can be remotely accessed by a mobile device (e.g., a cell phone, personal digital assistant (PDA), tablet computer, laptop computer, or the like). The APLS, which stores identification and location information of the access points, can be requested to provide such information to the mobile device so that the mobile device can use the access points as reference points in calculating the mobile device's location using trilateration techniques. Examples of queries from a mobile device to the APLS include public fetching operations, in which the mobile device requests information regarding all access points in a specified region (e.g., a specified geographic tile), and private fetching operations, in which the mobile device requests information regarding a specified list of access points.

More specifically, for some embodiments, the mobile device includes a local memory that stores a cache of Wi-Fi access point location data, and includes a processor that can execute WLAN positioning software, APLS data retrieval software, and APLS data decoding software. The positioning software may calculate the position of the mobile device using the locations of a number of nearby access points as reference points. The data retrieval software may selectively request location data for Wi-Fi access points from the APLS using public and/or private fetching operations, and may dynamically switch between such fetching operations in response to parameters such as motion of the mobile device, the storage capacity of the local cache memory, the data retrieval history of the mobile device, and/or the refresh rate of the APLS. The APLS data decoding software may decode data received from the APLS.

FIG. 1 is a block diagram of a wireless positioning system 100 in accordance with the present embodiments. System 100 is shown to include a mobile communication device (MCD) 110, a wireless local area network (WLAN) 120, and an APLS 130. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAC3, respectively) that is programmed therein by, for example, the manufacturer of the access point. Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the access point device (e.g., whether the AP is made by Cisco Systems, Inc.), and may be assigned to such organizations by the Institute of Electrical and Electronic Engineers (IEEE). The second 3 bytes of the MAC address, which may be referred to as the network interface controller (NIC) specific bytes, may be used to uniquely identify the individual access point device.

The APLS 130, which stores the MAC addresses and location coordinates of a plurality of deployed access points (e.g., not just access points AP1-AP3 of FIG. 1), provides an online database accessible by mobile device 110 that may be provided by companies such as Google, Skyhook, Devicescape, and/or WiGLE. The APLS 130 may also store other information associated with the access points including, for example, the accuracy of the location coordinates of each access point, the last location update for each access point, the last time each access point was visible, the protocol version of each access point, and so on. For some embodiments, selected portions of the data stored in APLS 130 can be retrieved and stored within mobile device 110, as described in more detail below.

Mobile device 110, which may also be referred to herein as the client device, can be any suitable Wi-Fi enabled wireless device including, for example, a cell phone, PDA, tablet computer, laptop computer, or the like. For the embodiments described herein, mobile device 110 includes radio frequency (RF) ranging circuitry (e.g., formed using well-known software modules, hardware components, and/or a suitable combination thereof) that can be used to estimate the distance between itself and one or more visible access points (AP) using suitable ranging techniques. For example, mobile device 110 can use received signal strength indicator (RSSI) and/or round trip time (RTT) techniques to estimate the distance between itself and the access points AP1-AP3, for example, by correlating each RSSI or RTT value with a distance. In addition, mobile device 110 includes a local memory that stores a cache of Wi-Fi access point location data, and includes a processor that can execute WLAN positioning software, APLS data retrieval software, and APLS data decoding software. The positioning software can calculate the position of mobile device 110 using the known locations of visible access points as reference points. The data retrieval software can selectively request location data for access points from the APLS using public and/or private fetching operations, and can dynamically switch between such private and public fetching operations in response to parameters such as motion of the mobile device, the storage capacity of the local cache memory, and/or the data retrieval history of the mobile device. The APLS data decoding software may decode data received from the APLS.

Figure 2A:
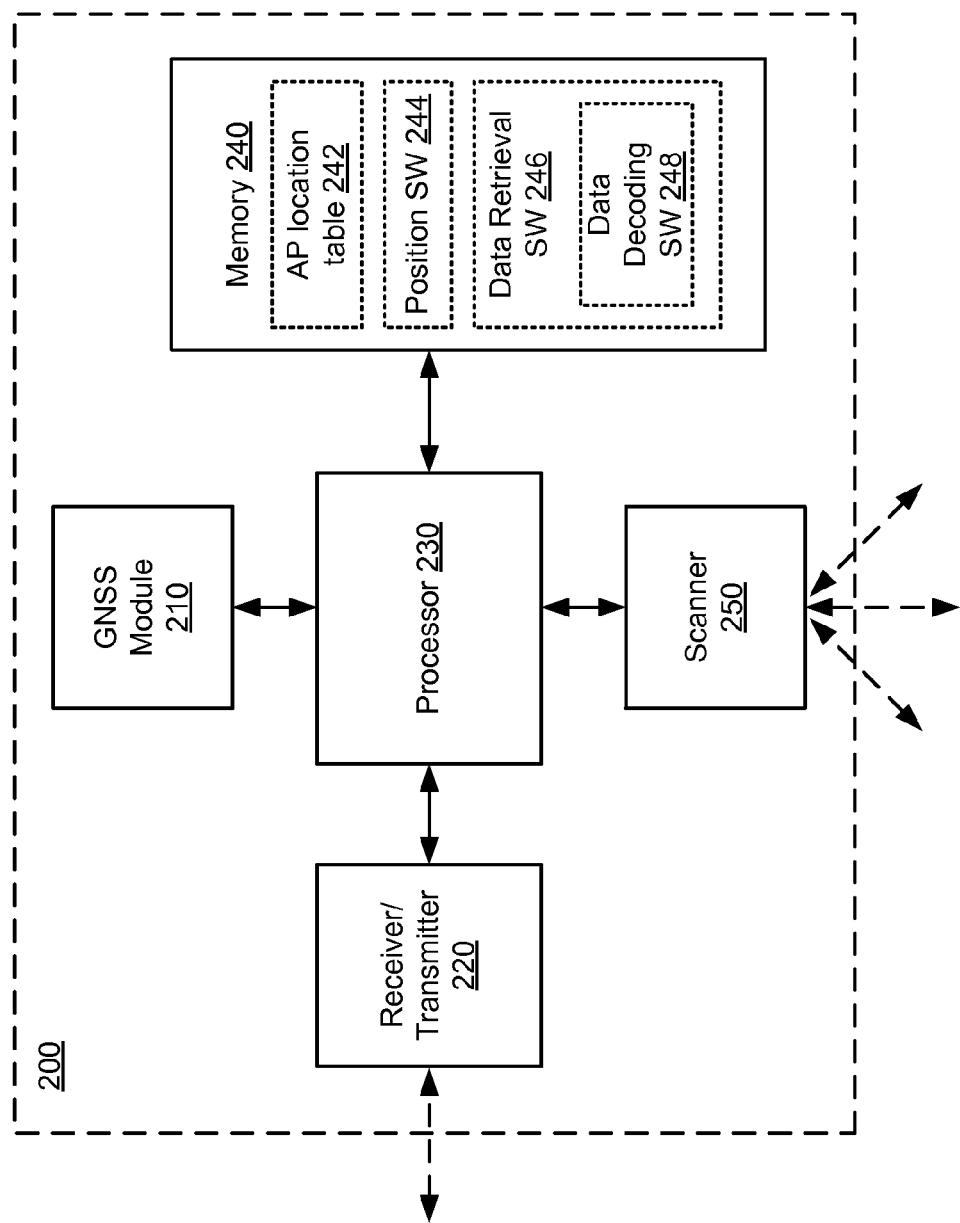
FIG. 2A is a block diagram of a mobile communication device in accordance with some embodiments.

FIG. 2A shows a mobile device 200 that is one embodiment of mobile device 110 of FIG. 1. Mobile device 200 includes a global navigation satellite system (GNSS) module 210, transmitter/receiver circuit 220, processor 230, memory 240, and scanner 250. The receiver/transmitter circuit 220 can be used to transmit signals to and receive signals from access points AP1-AP3 and/or APLS 130 (see also FIG. 1). Scanner 250, which is well-known, can be used to scan the surrounding environment to detect and identify nearby access points (e.g., access points within range of mobile device 200). For some embodiments, the scanner 250 can search for nearby access points by periodically transmitting MAC address request frames. An access point within range of mobile device 200 receives one or more of the requests and responds by transmitting its MAC address to the mobile device 200. If mobile device 200 has line-of-sight with a suitable number (e.g., 3 or more) navigation satellites, the GNSS module 210 can determine the current location of mobile device 200 using triangulation techniques, and can then provide the location information to processor 230 for storage in memory 240.

Memory 240 includes an access point location table 242 that can be used as a local cache to store the MAC addresses of a plurality of access points, the location coordinates of such access points, and other suitable location or configuration information of the access points. An exemplary format for one embodiment of the location table 242 associated with mobile device 200 is shown below in Table 1. The location table shown in Table 1 below includes a plurality (n) of row entries, each for a corresponding one of a plurality (n) of access points. More specifically, each row entry includes an access point field to store the name of the associated access point, a BSSID field to store the MAC address of the access point, a coordinate field to store the location coordinates of the access point, and an uncertainty field to store a location uncertainty value for the access point. For some embodiments, the location uncertainty value may be expressed as a percentage (e.g., ±5%). For other embodiments, the location uncertainty value may be expressed as a distance range (e.g., ±2 m). Of course, for still other embodiments, the location uncertainty value may be expressed using other suitable indications.

TABLE 1

| Access point | BSSID | Location coordinates | Location uncertainty |
| --- | --- | --- | --- |
| AP1 | MAC1 | x1, y1, z1 | UNC1 |
| AP2 | MAC2 | x2, y2, z2 | UNC2 |
| . | | | |
| . | | | |
| . | | | |
| APn | MACn | xn, yn, zn | UNC3 |

Figure 5:
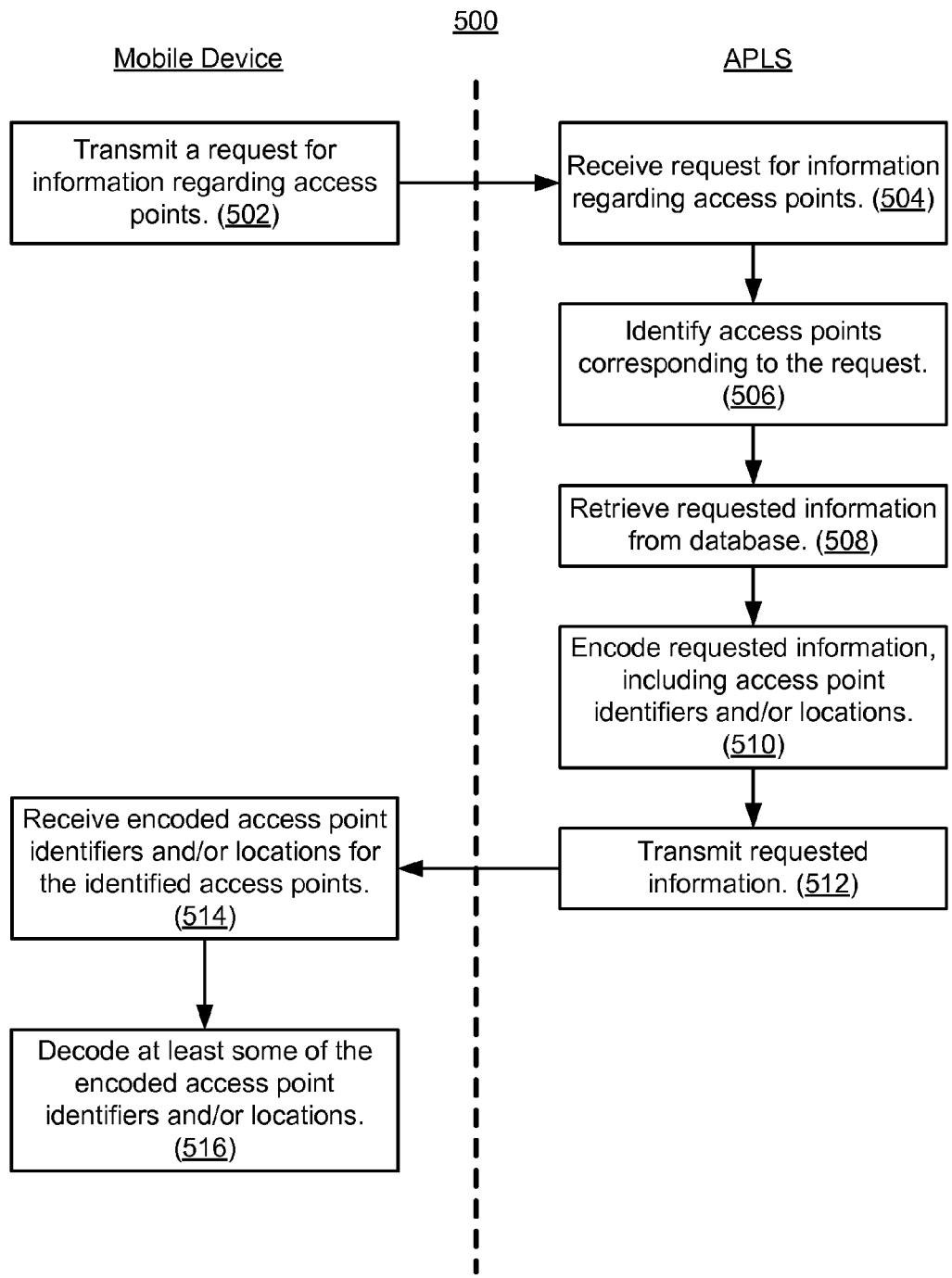
FIG. 5 is a flowchart illustrating a method of obtaining information regarding access point servers in accordance with some embodiments.

Memory 240 also includes a non-transitory computer-readable medium (e.g., one or more nonvolatile memory elements, such as EPROM, EEPROM, Flash memory, a hard drive, and so on) that stores the following software modules:
- a positioning software module 244 to determine the location of the mobile device based on locations of access points using trilateration techniques; and
- a data retrieval software module 246 to query the APLS 130 for access point information (e.g., as described for operations 502 and 514, FIG. 5). The data retrieval software module includes a data decoding module 248 to decode encoded access point information (e.g., including identifiers and location coordinates) received from the APLS 130 (e.g., as described for operation 516, FIG. 5).

Each software module includes instructions that, when executed by processor 230, cause the mobile device 200 to perform the corresponding functions. The non-transitory computer-readable medium of memory 240 thus includes instructions for performing all or a portion of the client-side operations of method 500 (FIG. 5).

Processor 230, which is coupled to receiver/transmitter 220, GNSS module 210, memory 240, and scanner 250, can be any suitable processor capable of executing scripts or instructions of one or more software programs stored in mobile device 200 (e.g., within memory 240). For example, processor 230 can execute WLAN positioning software module 244 and data retrieval software module 246. The positioning software module 244 can be executed by processor 230 to determine the location of mobile device 200 using nearby access points as reference points. For example, to determine the position of mobile device 200, the precise locations of three selected access points (e.g., access points AP1-AP3) are first determined, either by accessing their location coordinates from location table 242 or by retrieving their location coordinates from the APLS 130, as explained in more detail below. Next, positioning software module 244 as executed by processor 230 estimates the distance between mobile device 200 and each of the selected access points using suitable RF ranging techniques (e.g., RSSI and/or RTT techniques), and uses the location coordinates of the selected access points and the estimated distances between them and mobile device 200 to calculate the position of mobile device 200 using trilateration techniques.

Figure 2B:
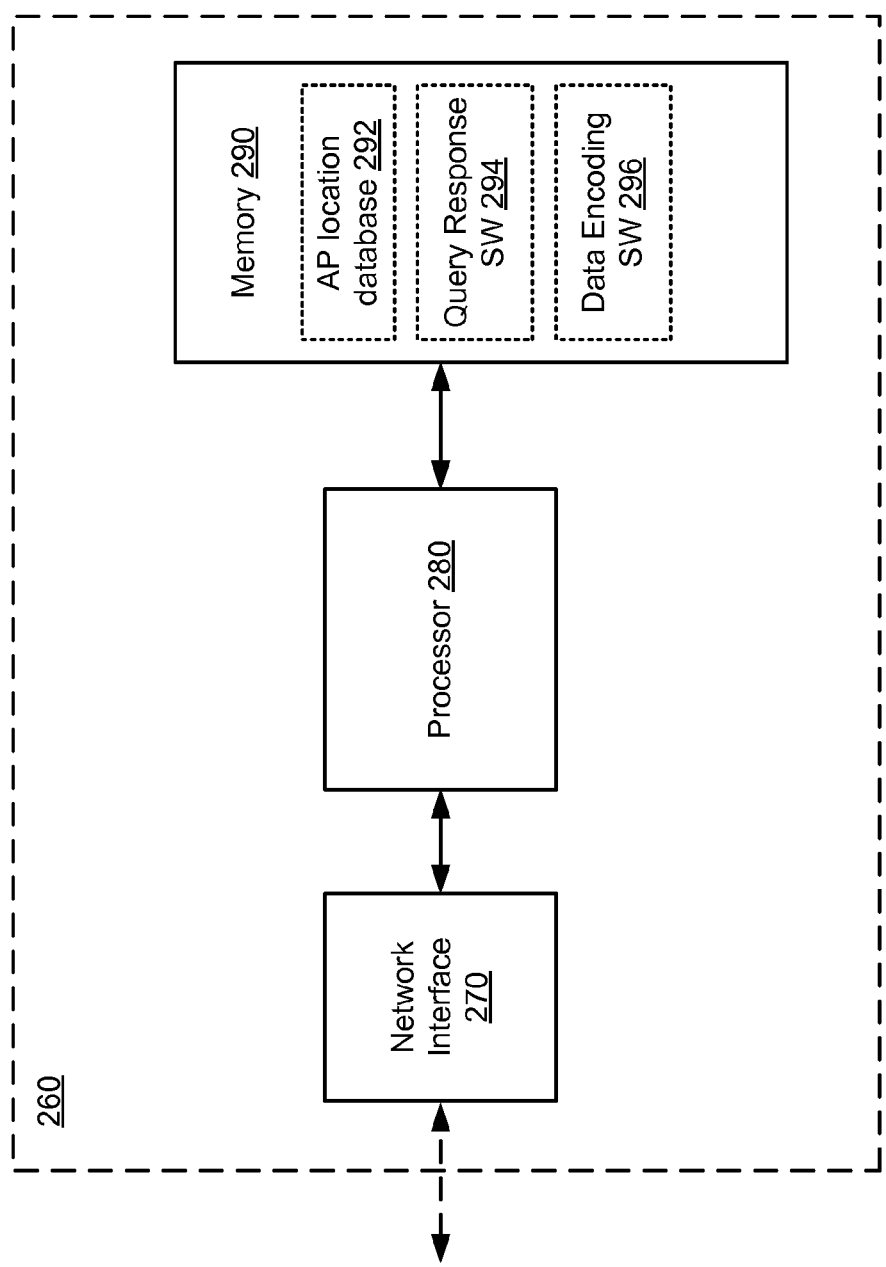
FIG. 2B is a block diagram of an access point location server system in accordance with some embodiments.

FIG. 2B shows an APLS 260 that is one embodiment of APLS 130 of FIG. 1. APLS 260 includes a network interface 270, a processor 280, and a memory 290. The network interface 270 can be used to receive signals (e.g., requests for access point information) from mobile devices 200 (FIG. 2A) via one or more intervening networks and to transmit signals (e.g., responses to the requests) to mobile devices 200 via the one or more intervening networks. Processor 280, which is coupled to network interface 270 and memory 290, can be any suitable processor capable of executing scripts or instructions of one or more software programs stored in APLS 260 (e.g., within memory 290).

Memory 290 includes an access point location database 292 that stores the MAC addresses (e.g., BSSIDs) of a plurality of access points, the location coordinates of such access points, and other suitable location or configuration information of the access points. In some embodiments, the location database 292 has a format similar to the format of the location table 242 for mobile device 200, as shown above in Table 1. When APLS 260 receives a request for access point information, processor 280 determines what information is being requested, queries location database 292 for the requested information, and generates a response containing the requested information in an encoded format, for transmission via network interface 270. In some embodiments, information in the location database 292 is encoded as described herein. Alternately, information is stored unencoded in the location database 292 and is subsequently encoded for transmission to a mobile device 200 in response to a request.

Memory 290 also includes a non-transitory computer-readable medium (e.g., one or more nonvolatile memory elements, such as EPROM, EEPROM, Flash memory, a hard drive, and so on) that stores the following software modules:
- a query response software module 294 to process and respond to queries from mobile devices 200 for access point information (e.g., as described for operations 504-508 and 512, FIG. 5); and
- a data encoding software module 296 to encode access point information (e.g., MAC addresses and location coordinates) for transmission in response to requests and/or for storage in location database 292 (e.g., as described for operation 510, FIG. 5).

Each software module includes instructions that, when executed by processor 280, cause the APLS 260 to perform the corresponding functions. The non-transitory computer-readable medium of memory 290 thus includes instructions for performing all or a portion of the server-side operations of method 500 (FIG. 5).

As discussed with regard to FIG. 2A, mobile device 200 retrieves location information of visible and/or non-visible access points from the APLS 130 using data retrieval software module 246 as executed by processor 230. In accordance with some embodiments, data retrieval software module 246 can selectively retrieve access point location information from the ALPS 130 using private fetching operations and/or public fetching operations. When using public fetching operations to retrieve access point location data from the APLS 130, mobile device 200 requests the APLS 130 to provide location information of access points that lie within a specified geographic area (also referred to as a region or geographic tile), even if some (or all) of such access points are not currently visible to mobile device 200.

Figure 3A:
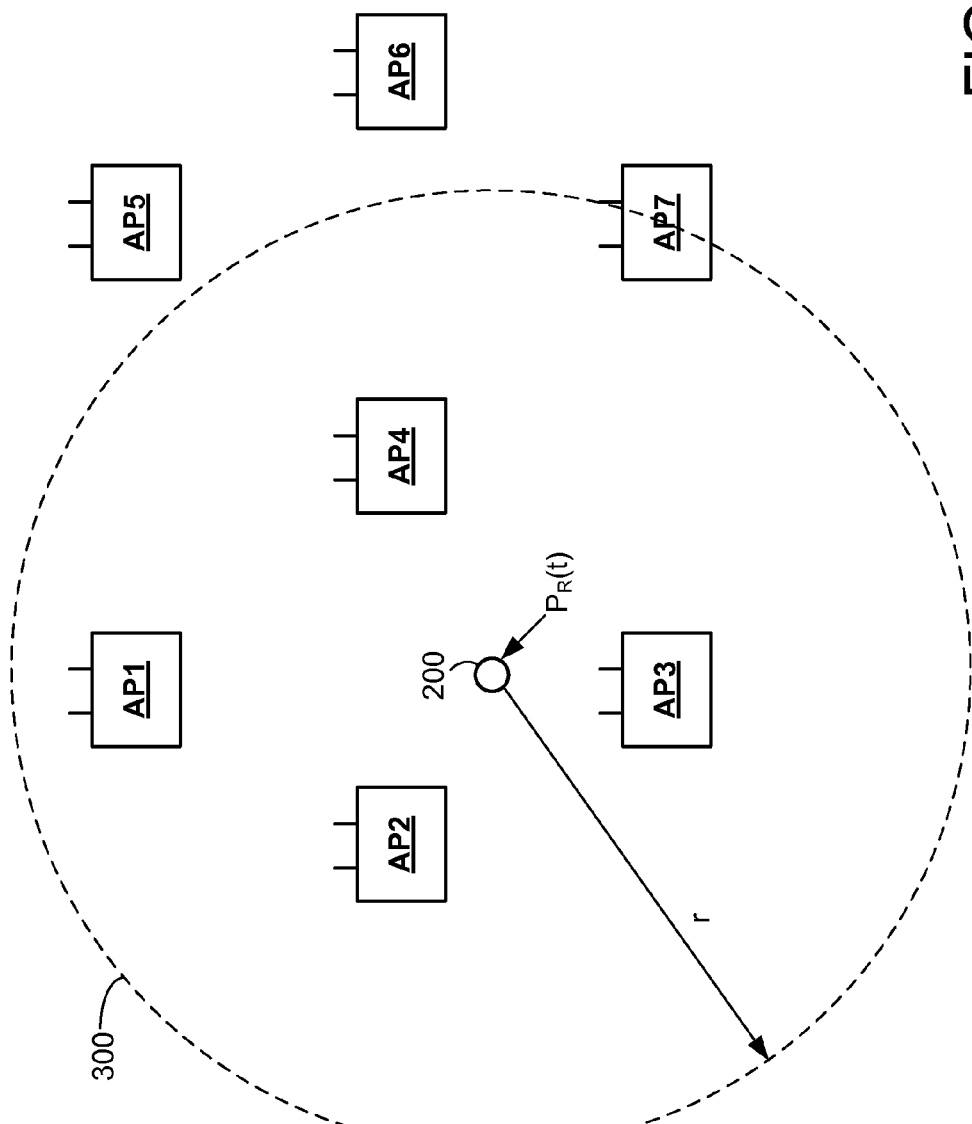
FIG. 3A shows an example of a specified region for a public fetching operation in accordance with some embodiments.

FIG. 3A shows an example of a region 300 for a public fetching operation. The region 300 is defined as the area within a radius r of the location $P_R(t)$ of a mobile device 200. (While the region 300 is shown as a two-dimensional area for visual clarity, in some embodiments the region 300 is a three-dimensional volume centered on the location PR(t) and having a radius r). Access points AP1-AP4 and AP7 are located within the region 300, while AP5 and AP6 are not. To perform a public fetching operation based on the region 300, mobile device 200 transmits to APLS 130 a request specifying the region 300, for example by providing its location $P_R(t)$ and the radius r in the request. In response, APLS 130 transmits to mobile device 200 encoded information (e.g., including identifiers and locations) about only those access points within the region 300. In the example of FIG. 3A, APLS 130 transmits information about AP1-AP4 and AP7, but not AP5 and AP6.

Figure 3B:
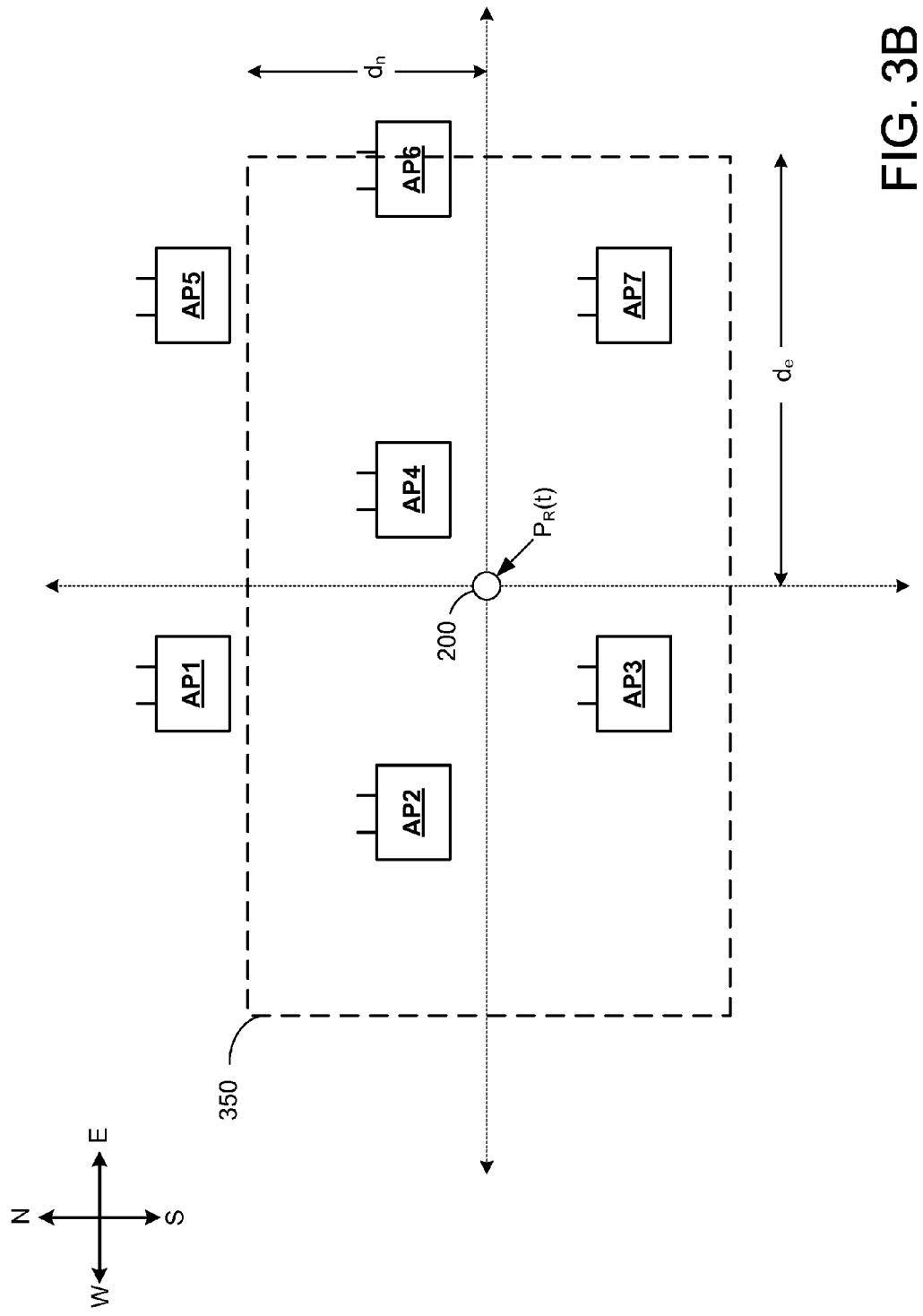
FIG. 3B shows another example of a specified region for a public fetching operation in accordance with some embodiments.

In other embodiments, a region 350 is defined using a reference location $P_R(t)$ of mobile device 200 and two geographic area configuration parameters $d_e$ and $d_n$, as illustrated in FIG. 3B. In the example of FIG. 3B, $d_e$ defines an eastern (and also western) boundary of region 350 and $d_n$ defines a northern (and also southern) boundary of region 350. (For still other embodiments, other geographic configuration parameters can be used to define the preferred geographic area.) Access points AP2-AP4, AP6, and AP7 are located within region 350, while AP1 and AP5 are not. During a public fetching operation, mobile device 200 transmits its current reference location $P_R(t)$ and preferred area parameters $d_e$ and $d_n$ to the APLS 130. In response, the APLS 130 identifies all known access points that lie within the region 350. APLS 130 thus provides mobile device 200 with encoded information (e.g., including identifiers and locations) for the set of access points that includes AP2-AP4 and AP6-AP7, but not AP1 and AP5.

By retrieving location information for access points that are not visible to mobile device 200, public fetching operations can reduce latency in calculating the position of mobile device 200 by "pre-fetching" location coordinates of access points before mobile device 200 is within their range. In addition, retrieving the location coordinates of access points not yet visible to mobile device 200 can allow mobile device 200 to later calculate its position using such access points even if the connection to the APLS 130 is subsequently lost or unavailable.

Alternatively, instead of performing a public fetching operation, mobile device 200 may perform a private fetching operation to retrieve access point location data from APLS 130. When using private fetching operations to retrieve access point location data from APLS 130, mobile device 200 queries APLS 130 for location information of a specified set of access points that are visible to mobile device 200. For example, mobile device 200 transmits to APLS 130 a list of MAC addresses (e.g., BSSIDs) identifying the specific access points for which location information is requested. The MAC addresses of the specified visible access points can be determined using either active or passive access point detection techniques. In active detection techniques, mobile device 200 broadcasts probe requests to the surrounding environment. According to the IEEE 802.11 protocols, access points in receipt of the probe request transmit a beacon signal containing the MAC address of the access point and other information such as the network name, the precise version of the protocol that it supports, its security configuration, and information about how to connect to the access point. In passive detection techniques, mobile device 200 monitors beacon signals broadcast by the access points, whereby each beacon signal includes the MAC address of the corresponding access point and/or other information noted above with respect to the active detection technique.

Referring again to FIG. 2A, once the MAC addresses of the visible access points are obtained for a private fetch operation, the data retrieval software module 246 as executed by processor 230 first checks the access point location table 242 within memory 240 to determine whether location table 242 stores the location information of the specified access points. If so, then the location information is provided to the positioning software module 244 to calculate the position of mobile device 200. If not, then the data retrieval software module 246 transmits the MAC addresses of the specified access points to the APLS 130. In response, the APLS 130 uses the provided MAC addresses as look-up values to access the location information of the requested access points, and then transmits the requested location information to mobile device 200. Thereafter, mobile device 200 can use the retrieved location information to calculate the position of mobile device 200.

Information transmitted to mobile device 200 in response to either a public or private fetch request includes identifiers and location coordinates for respective access points, and may include additional information (e.g., location certainties). Accordingly, it is desirable to encode the access point identifiers and location coordinates.

In some embodiments, each access point has a 48-bit identifier, referred to as a BSSID, that serves as the MAC address of the access point. The 48-bit identifier can be represented as twelve four-bit nibbles: $(x_1x_2{:}x_3x_4{:}x_5x_6{:}x_7x_8{:}x_9x_{10}{:}x_{11}x_{12})$. An example of such an identifier, using hexadecimal notation, is C8:3A:35:48:C6:80. Given a set of n MAC addresses $M=(M_1, \ldots, M_n)$, where n is an integer greater than one, to be sent from APLS 130 to mobile device 200, an encoding scheme is used that exploits the redundant nibbles among this list in accordance with some embodiments. In this encoding scheme, the set $\{M_1, \ldots, M_n\}$ is sorted into different subsets (e.g., based on manufacturer). Then, for each subset s, a reference identifier $M_0^s$ is chosen. (Alternatively, the set is not divided into subsets, and a single reference identifier is chosen for the entire set). In some embodiments, the reference identifier $M_0^s$ is chosen from the subset. In other embodiments, the reference identifier $M_0^s$ is synthetically constructed to provide a high number of redundant nibbles for the subset (e.g., to maximize the number of redundant nibbles for the subset) and thus a high compression ratio.

In some embodiments, encoding software (e.g., data encoding software 296, FIG. 2B) in APLS 130 dynamically selects between the two techniques based on one or more criteria. In one example, the technique is selected based on the level of redundancy in the set or subset. A synthetic reference identifier $M_0^s$ is used if the resulting level of redundancy (or the corresponding compression ratio or encoding gain) is greater than a specified level (e.g., the synthetic reference identifier $M_0^s$ results in more than 12 redundant nibbles). Otherwise the reference identifier $M_0^s$ is chosen from the set or subset. In another example, the technique is selected based on the number of access points identified as corresponding to a request. If the number of access points is less than or equal to a specified value, then the reference identifier $M_0^s$ is chosen from the subset; if the number of access points is greater than the specified value, the reference identifier $M_0^s$ is synthetically constructed.

For some embodiments in which the reference identifier $M_0^s$ is chosen from the subset (or entire set), a technique for choosing the reference identifier is now described. Consider a subset $\{M_1, \ldots, M_{ns}\}$, where ns is the number of identifiers in the subset. A matrix Z is computed such that each element $z(i,j)$ above and to the right of the diagonal equals the number of identical nibbles (or other suitable grouping of bits) between $M_i$ and $M_j$ for i=1, ..., ns; j=i, ..., ns, and all elements on the diagonal or below and to the left of the diagonal are set to zero:

$$Z = \begin{pmatrix} 0 & z(1,2) & \cdots & z(1, ns) \\ & & & \vdots \\ \vdots & \ddots & & z(ns-1, ns) \\ 0 & \cdots & & 0 \end{pmatrix}$$

A vector v is computed with elements $v(i)$ as follows:

$$v(i) = \sum_{j=i}^{ns} z(i, j)$$

An index k is identified for which the value of the corresponding element of v is maximized: $v(k)=\max(v)$. The identifier $M_k$ is chosen as the reference identifier $M_0^s$ and is sent to mobile device 200.

Alternatively, to synthetically construct the reference identifier $M_0^s$, the subset of identifiers $\{M_1, \ldots, M_{ns}\}$ is examined to determine, for each nibble (or other appropriate grouping of bits), the most commonly occurring value and thus the most redundant value. The kth nibble $M_0^s[k]$ (where, for example, k=1, ..., 12) of the reference identifier $M_0^s$ thus is chosen as the most redundant nibble of the nibbles $M_i[k]=x_k$ in the subset of identifiers. For each value of k, nibble $M_0^s[k]$ of the reference identifier therefore has a value equal to the value having the greatest frequency of occurrence among nibbles $M_1[k], \ldots, M_{ns}[k]$.

Regardless of how the reference identifier $M_0^s$ is chosen, APLS 130 sends reference identifier $M_0^s$ to mobile device 200 in complete precision (e.g., sends all 12 nibbles and thus all 48 bits). For subsequent identifiers $M_i$, APLS 130 sends information identifying nibbles that are identical to (and thus redundant with) corresponding nibbles in the reference identifier $M_0^s$, and sends the parts of the subsequent identifiers $M_i$ that are not identified as being identical to (redundant with) the corresponding nibbles in the reference identifier $M_0^s$.

In some embodiments, an encoding word and an encoding mask are used to identify nibbles that are identical to corresponding nibbles in the reference identifier $M_0^s$. The encoding word includes bits to identify whether respective sets of nibbles in an identifier $M_i$ are encoded. In some embodiments, a set of nibbles will be encoded if it includes at least a specified number of nibbles (e.g., two or more nibbles) that are redundant over the corresponding nibbles of the reference identifier $M_0^s$. (Alternatively, a set of nibbles will be encoded if it includes any nibbles that are not redundant over the corresponding nibbles of the reference identifier $M_0^s$.) If a set of nibbles includes at least the specified number of redundant nibbles, then an encoding mask indicates which nibbles are redundant. For example, the 12 nibbles of a MAC address are divided into two sets: the six most significant nibbles and the six least significant nibbles. The encoding mask includes two bits: a first bit to indicate whether two or more of the six most significant nibbles are redundant, and a second bit to indicate whether two or more of the six least significant nibbles are redundant. A value of '0' (or, alternatively, '1') for a respective set of nibbles indicates that no more than one of the nibbles in the set is redundant, and thus that there is no encoding of the nibbles in the set; instead, the values of every nibble in the set are transmitted with complete precision. A value of '1' (or, alternatively, '0') for a respective set of nibbles indicates that at least two of the nibbles in the set are redundant, and thus that encoding is used to transmit the set.

The encoding mask (EM) includes bits to identify which nibbles (or other suitable grouping of bits) in a set of nibbles are redundant. For example, each bit of the encoding mask for a set of nibbles corresponds to a respective nibble. A value of '0' (or, alternatively, '1') for a respective bit of the encoding mask indicates that the corresponding nibble is not redundant (i.e., is not identical to the corresponding nibble of the reference identifier $M_0^s$) and thus is not encoded; instead, the nibble is transmitted with complete precision. A value of '1' (or, alternatively, '0') for the respective bit indicates that the corresponding nibble is redundant (i.e., is identical to the corresponding nibble of the reference identifier $M_0^s$). Redundant nibbles as specified by the encoding mask are not transmitted from APLS 130 to mobile device 200. In some embodiments, if an encoding word indicates that a set of nibbles is not encoded, no encoding mask for that set of nibbles is transmitted. (In some alternate embodiments, there is no encoding word and an encoding mask is sent for the entire reference identifier.)

Bits of the encoding word are referred to as encoding bits. Table 2 below illustrates examples of encoding bit (EB) values and corresponding encoding masks. EB=00 indicates that no encoding is used for a respective identifier. Therefore, no encoding mask is sent; instead, the entire respective identifier is sent in complete precision. EB=01 indicates that the six most significant (MS) nibbles of a respective identifier are not encoded, but that the six least significant (LS) nibbles are encoded. A six-bit encoding mask is sent specifying which of the six least significant nibbles are redundant. EB=10 indicates that the six least significant nibbles of a respective identifier are not encoded, but that the six most significant nibbles are encoded. A six-bit encoding mask is sent specifying which of the six most significant nibbles are redundant. EB=11 indicates that both the six least significant nibbles and the six most significant nibbles are encoded. A 12-bit encoding mask is sent specifying which of the 12 nibbles are redundant. In each case in which an encoding mask indicates that a respective nibble is not redundant, the respective nibble is sent from APLS 130 to mobile device 200.

TABLE 2

| Encoding bits (EB) | Definition | Encoding mask (EM) |
|---|---|---|
| 00 | No encoding | No mask sent |
| 01 | Encoding 6 LS nibbles | 6 bits mask sent |
| 10 | Encoding 6 MS nibbles | 6 bits mask sent |
| 11 | Encoding all 12 nibbles | 12 bits mask sent |

Given $N_1$ and $N_2$ as the number of redundant nibbles in the MS and LS nibbles of an identifier $M_1$ respectively, an example of the encoding bits EB is shown in Table 3 in accordance with some embodiments:

TABLE 3

| | $N_2$ | | | | | | |
|---|---|---|---|---|---|---|---|
| $N_1$ | 0 | 1 | 2 | 3 | 4 | 5 | 6 |
| 0 | 00 | 00 | 01 | 01 | 01 | 01 | 01 |
| 1 | 00 | 00 | 01 | 01 | 01 | 01 | 01 |
| 2 | 10 | 10 | 11 | 11 | 11 | 11 | 11 |
| 3 | 10 | 10 | 11 | 11 | 11 | 11 | 11 |
| 4 | 10 | 10 | 11 | 11 | 11 | 11 | 11 |
| 5 | 10 | 10 | 11 | 11 | 11 | 11 | 11 |
| 6 | 10 | 10 | 11 | 11 | 11 | 11 | NA |

For the example of 48-bit identifiers (L=48 bits) and encoding words with encoding bits EB as defined in Table 3, the encoding gain, in percent, can be written as:

$$EB = 00, G = 100 \times \frac{L+2}{L}$$

$$EB = 10, G = 100 \times \frac{2+6+L-N_1}{L}$$

$$EB = 01, G = 100 \times \frac{2+6+L-N_2}{L}$$

$$EB = 11, G = 100 \times \frac{2+12+L-(N_1+N_2)}{L}$$

Table 4 shows the encoding gain in percent (%) for all possible combinations of $N_1$ and $N_2$ in this example. (The example of 6 redundant MS nibbles and 6 redundant LS nibbles is not applicable, because identifiers are unique.)

TABLE 4

| | $N_2$ | | | | | | |
|---|---|---|---|---|---|---|---|
| $N_1$ | 0 | 1 | 2 | 3 | 4 | 5 | 6 |
| 0 | -4.17 | -4.17 | 0 | 8.33 | 16.67 | 25 | 33.33 |
| 1 | -4.17 | -4.17 | 0 | 8.33 | 16.67 | 25 | 33.33 |
| 2 | 0 | 0 | 4.17 | 12.50 | 20.83 | 29.17 | 37.5 |

TABLE 4-continued

| | $N_2$ | | | | | | |
|---|---|---|---|---|---|---|---|
| $N_1$ | 0 | 1 | 2 | 3 | 4 | 5 | 6 |
| 3 | 8.33 | 8.33 | 12.50 | 20.83 | 29.17 | 37.5 | 45.83 |
| 4 | 16.67 | 16.67 | 20.83 | 29.17 | 37.5 | 45.83 | 54.16 |
| 5 | 25 | 25 | 29.17 | 37.5 | 45.83 | 54.16 | 62.5 |
| 6 | 33.33 | 33.33 | 37.5 | 45.83 | 54.16 | 62.5 | NA |

FIG. 4A and Table 5 (below) illustrate an example of encoding access point identifiers in accordance with some embodiments. In this example, the following identifiers are determined to correspond to a request from mobile device 200 and thus are to be encoded for transmission from APLS 130 to mobile device 200:

$M_1$=00:0C:C3:4F:74:92
$M_2$=00:0C:C3:4D:AF:52
$M_3$=68:7F:74:36:E0:77
$M_4$=C8:3A:35:48:B6:88
$M_5$=00:16:01:F0:53:5D

A reference identifier Mg=00:0C:C3:4F:B0:72 is synthetically constructed using the technique described above. Each nibble of the reference identifier $M_0^s$ is assigned a value equal to the most redundant (i.e., most frequently occurring) value of the corresponding nibbles of the identifiers $M_1$-$M_5$. For example, the most frequently occurring values of the two most significant nibbles are 00, with three occurrences each, and the most frequently occurring values of the next two most significant nibbles are 0C, with two occurrences each. Accordingly, the four most significant nibbles of the reference identifier $M_0^s$ are assigned the values 00:0C. When no single value occurs more frequently than other values for a respective nibble, one of the most frequently occurring values is chosen. For example, each of the third least significant nibbles of the identifiers $M_1$-$M_5$ has a different value (4, F, 0, 6, and 3). In this example, the value '0' is chosen for the corresponding nibble of the reference identifier $M_0^s$.

Values of EB and EM are determined for each of the identifiers $M_1$-$M_5$, as shown in Table 5. Redundant nibbles in Table 5 are shown in bold. When a set of six nibbles has an encoding bit equal to '1', an encoding mask is sent. Each bit in the encoding mask indicates whether a corresponding nibble is redundant. Non-redundant nibbles as identified by the encoding mask are transmitted but redundant nibbles are not. Table 5 and FIG. 4A show examples of this for the most significant six nibbles of $M_1$, $M_2$, and $M_5$, and for the least significant nibbles of $M_1$, $M_2$, $M_3$, and $M_4$. When a set of six nibbles has an encoding bit equal to '0', no encoding mask is sent, and every nibble in the set is transmitted. Table 5 and FIG. 4A show examples of this for both nibbles of $M_0^s$, the most significant nibbles of $M_3$ and $M_4$, and the least significant nibble of $M_5$. The encoding bits, encoding masks (if any), and data for each identifier $M_0^s$-$M_5$ are transmitted at respective times $t_0$-$t_5$.

TABLE 5

| Time | Identifier | EB | EM | Original data | Data sent |
|---|---|---|---|---|---|
| $t_0$ | $M_0^s$ | 00 | None | 00:0C:C3:4F:B0:72 | 00:0C:C3:4E:B0:72 |
| $t_1$ | $M_1$ | 11 | 111111110001 | 00:0C:C3:4F:74:92 | 749 |
| $t_2$ | $M_2$ | 11 | 111111100001 | 00:0C:C3:4D:AF:52 | DAF5 |
| $t_3$ | $M_3$ | 01 | 000110 | 68:7F:74:36:E0:77 | 68:7F:74:36E7 |
| $t_4$ | $M_4$ | 01 | 101000 | C8:3A:35:48:B6:88 | C8:3A:35:8688 |
| $t_5$ | $M_5$ | 10 | 110000 | 00:16:01:F0:53:5D | 16:01:F0:53:5D |

While FIG. 4A only shows transmission of encoded identifiers, in some embodiments encoded access point locations are transmitted along with corresponding encoded identifiers. For example, locations of access points in a geographical area such as region 300 (FIG. 3A) or 350 (FIG. 3B) are transmitted. In some embodiments, the locations are specified by coordinates (e.g., latitude, longitude, and altitude), which are transmitted in an encoded format. Latitude defines north/south directions and covers 180°. Longitude defines east/west direction and covers 360°. Altitude is expected to be in vicinity of the earth's surface and thus covers approximately 8 km.

The coordinates can be expressed in binary format. The binary representation of latitude and longitude depends on the target precision. Given that the earth's contour is approximately $4e^4$ km (i.e., $4\times10^4$ km), the number of bits used to represent the latitude and longitude is given in table 6 (since latitude spans only half of the earth's contour, its representation uses one less bit compared to longitude).

TABLE 6

| Resolution | N° of Lon points | N° of bits for Lon | N° of bits for Lat |
|---|---|---|---|
| 1 cm | $4e^9$ | 32 | 31 |
| 50 cm | $8e^7$ | 27 | 26 |
| 1 m | $4e^7$ | 26 | 25 |

A client mobile device 200 requesting access point locations can also specify the desired precision of the access point location encoding. In this case the APLS 130 will encode the latitude, longitude, and altitude such that the desired precision is fulfilled. Precision varies depending on location, as shown in Table 7:

TABLE 7

| Precision | Precision at equator | Precision at 45° | Precision at 60° |
|---|---|---|---|
| 1° | 111 km | 79 km | 56 km |
| 0.1° | 11 km | 7.9 km | 5.6 km |
| 0.01° | 1.1 km | 790 m | 560 m |
| 0.001° | 110 m | 79 m | 56 m |
| 0.0001° | 11 m | 7.9 m | 5.6 m |
| 0.00001° | 1.1 m | 79 cm | 56 cm |
| 0.000001° | 11 cm | 7.9 cm | 5.6 cm |
| 0.0000001° | 1.1 cm | 0.79 cm | 0.56 cm |

In some embodiments, encoding of location coordinates of the access points corresponding to a given request from a mobile device 200 exploits redundancies in the most significant bits used to represent the location coordinates. In binary format, a latitude coordinate can be written as: $x^{Lat} = b_M^{Lat} \ldots b_0^{Lat}$, where each value b is a bit, with $b_M^{Lat}$ being the most significant bit and $b_0^{Lat}$ being the least significant bit. Similarly, a longitude coordinate can be written as $x^{Lon} = b_M^{Lon} \ldots b_0^{Lon}$ and an altitude coordinate can be written as $x^{Alt} = b_M^{Lon} \ldots b_0^{Lon}$. For each access point $AP_i$ with coordinates in binary representation $AP_i^{Lat} = b_M^{(Lat,i)} \ldots b_0^{(Lat,i)}$, $AP_i^{Lon} = b_N^{(Lon,i)} \ldots b_0^{(Lon,i)}$, $AP_i^{Alt} = b_P^{(Alt,i)} \ldots b_0^{(Alt,i)}$ in the set (or a subset) of access points corresponding to a request, there exists an index $h_{Lat}$ such that:

$$\begin{cases} b_j^{(Lat,i)} = b_j^{(Lat,k)} & \text{for } j = M, \ldots, h_{Lat} \\ b_j^{(Lat,i)} \neq b_j^{(Lat,k)} & \text{for } j = h_{Lat} - 1, \ldots, 0 \end{cases}$$

The index $h_{Lat}$ identifies the most significant bits that are identical for all of the latitude values in the set or subset, and thus are common. These common bits are only transmitted once instead of being transmitted for each of the latitude values. Similar indices $h_{Lon}$ and $h_{Alt}$ exist for longitude and altitude, and the common most significant longitude and altitude bits are only transmitted once instead of being transmitted for every longitude value and altitude value in the set or subset.

In some embodiments, for every set of location coordinates the APLS 130 sends:
The numbers of bits in the common most significant portions of the coordinates. These numbers are specified, for example, in fixed field sizes (e.g., 5 bits).
The number of coordinates (e.g., latitudes/longitudes/altitude values, which indicates the number of access points) in a set or subset. This number is specified, for example, in a fixed field size (e.g., 10 bits).
The common most significant portions of the coordinates.
The least significant portions of each coordinate, which are not common between every coordinate in the set or subset.

FIG. 4B illustrates the transmission from APLS 130 to mobile device 200 of location information encoded in this manner for a set of five access points $AP_1$-$AP_5$. Starting at a time t, the number of bits in the common most significant portions of the coordinates (MSP bit counts 400) is transmitted, followed by the number of coordinates (coordinate count 410), the common most significant portions of the coordinate values (MSPs 420), and, for each of the access points $AP_1$-$AP_5$, respective least significant portions of the coordinate values (LSPs 430-1 through 430-5). By sending the MSPs 420 only once instead of for each coordinate, the total amount of transmitted data is reduced.

FIG. 5 is a flowchart illustrating a method 500 of obtaining information regarding access point servers in accordance with some embodiments. In the method 500, a mobile device 200 transmits (502) a request for information regarding access points to an APLS 130. For example, the request is part of a public fetch operation or, alternatively, a private fetch operation.

APLS 130 receives (504) the request and identifies (506) the access points that correspond to the request. For example, APLS 130 determines which access points are in a geographical area (e.g., a region 300 or 350, FIGS. 3A-B) specified in the request. In another example, APLS 130 identifies the access points listed in the request.

APLS 130 retrieves (508) requested information (e.g., locations of the access points identified at 506) from a database (e.g., AP location database 292, FIG. 2B). The requested information is encoded (510). In some embodiments, access point identifiers are encoded (e.g., as illustrated for the example of Table 5). Encoded access point identifiers include, for example, a reference identifier (e.g., $M_0^s$) that includes a number of groups of bits (e.g., 12 nibbles). The encoded identifiers also include encoding masks for respective access point identifiers, wherein a respective encoding mask identifies groups of bits for the respective access point identifier that are identical to corresponding groups of bits for the reference identifier. The encoded identifiers also include, for respective access point identifiers, groups of bits that are not identical to the corresponding groups of bits for the reference identifier. In some embodiments, the encoded identifiers further include encoding words for respective access point identifiers, wherein a respective encoding word identifies whether counts of how many groups of bits in respective sets of groups are identical to corresponding groups of bits in the reference identifier satisfy a criterion (e.g., whether two or more groups in a set of groups are identical to corresponding groups in the reference identifier). In some embodiments, no encoding masks are present for sets of groups that do not satisfy the criterion.

In some embodiments, access point locations are encoded (e.g., based on common most significant portions, as described above). For example, a set of encoded locations includes sets of coordinate values. Each set of coordinate values includes a single sequence of most significant bits common to every value of the set and sequences of least significant bits for respective values of the set (e.g., wherein the least significant bits are not common to every value of the set.) The single sequence is the most significant portion of each coordinate value, and the sequences of least significant bits are least significant portions of respective coordinate values.

The requested information is transmitted (512) from APLS 130 (e.g., as illustrated in FIGS. 4A-4B) and received (514) by the mobile device 200. Mobile device 200 decodes at least some of the encoded access point identifiers and/or locations (516). The received information is used, for example, to determine the location of the mobile device 200 (e.g., using trilateration techniques).

In some embodiments, decoding encoded identifiers includes identifying groups of bits that are identical to corresponding groups of bits for the reference identifier, based at least in part on the respective encoding mask. Groups of bits that are identified as identical to corresponding groups of bits for the reference identifier are assigned values of the corresponding groups of bits for the reference identifier. Groups of bits that are not identified as identical to corresponding groups of bits for the reference identifier are assigned their received values. In some embodiments, a group of bits may be identical to a corresponding group of bits for the reference identifier but may not be identified as such (e.g., because it is the only redundant group in its set, and no encoding mask is associated with a set unless the set has at least two redundant groups). In such a case, the group may be assigned its received value, and not the value of the corresponding group for the reference identifier.

In some embodiments, decoding encoded locations includes, for a respective coordinate value, concatenating the single sequence of most significant bits and a respective sequence of least significant bits.

Method 500 thus provides an efficient way to transmit access point information from APLS 130 to mobile device 200. The encoding used in method 500 reduces server load and network traffic and thus makes the overall process of determining a mobile device's location based on access point locations more efficient.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow chart of FIG. 5 can be performed in other suitable orders and/or one or more methods steps may be omitted.

What is claimed is:

1. A method performed by a mobile device for obtaining information regarding access points in a wireless network, the method comprising:

transmitting to a location server a request for information regarding access points;

in response to the request, receiving encoded access point identification data for a plurality of access points corresponding to the request, the encoded access point identification data comprising:

a reference identifier comprising a number of groups of bits, an encoding mask for an access point identifier, wherein the encoding mask identifies groups of bits for the access point identifier that are identical to corresponding groups of bits for the reference identifier, groups of bits of the access point identifier that are not identical to corresponding groups of bits for the reference identifier;

decoding at least some of the encoded access point identification data;

receiving, in response to the request, encoded locations for the plurality of access points;

decoding at least some of the encoded locations, wherein:

the request specifies a region;

the plurality of access points is located within the region; and the encoded locations comprise encoded sets of coordinate values, wherein a respective encoded set of coordinate values comprises:

a single sequence of most significant bits common to every value of the set; and sequences of least significant bits for respective values of the set, wherein the least significant bits are not common to every value of the set; and decoding the encoded locations comprises, for a respective coordinate value, concatenating the single sequence of most significant bits and a respective sequence of least significant bits.

2. The method of claim 1, wherein the decoding comprises:

identifying groups of bits of the access point identifier that are identical to corresponding groups of bits for the reference identifier, based at least in part on the respective encoding mask;

for the groups of bits of the access point identifier that are identified as identical to corresponding groups of bits for the reference identifier, using values of the corresponding groups of bits for the reference identifier; and for the groups of bits of the access point identifier that are not identified as identical to corresponding groups of bits for the reference identifier, using values of the received groups of bits.

3. The method of claim 1, wherein the groups of bits comprise nibbles.

4. The method of claim 1, wherein:

the groups of bits are arranged in sets; and the encoded access point identification data further comprise an encoding word for the access point identifier, wherein the encoding word identifies whether counts of how many groups of bits in respective sets of groups are identical to corresponding groups of bits in the reference identifier satisfy a criterion.

5. The method of claim 4, wherein no encoding mask is received for a set in which the count does not satisfy the criterion.

6. The method of claim 4, wherein:

the number of groups of bits is twelve nibbles; and the sets comprise a first set of the six most significant nibbles and a second set of the six least significant nibbles.

7. The method of claim 1, wherein the access point identifier comprises a basic service set identifier (BSSID).

8. The method of claim 1, wherein the access point identifier comprises a media access control (MAC) address.

9. The method of claim 1, wherein the reference identifier is an identifier of a first access point of the plurality of access points.

10. The method of claim 1, wherein the reference identifier is a synthetically constructed identifier.

11. The method of claim 10, wherein respective groups of bits of the reference identifier have the most redundant values of the corresponding groups of bits of access point identifiers for the plurality of access points.

12. The method of claim 1, wherein the location server comprises an Access Point Location Server (APLS).

13. The method of claim 1, wherein the encoded sets of coordinate values comprise encoded sets of latitude values, encoded sets of longitude values, and encoded sets of altitude values.

14. The method of claim 1, wherein the request specifies the plurality of access points.

15. A mobile device comprising:
a processor; and
a memory coupled to the processor and having stored therein computer-executable instructions that when executed by the processor cause the mobile device to:
transmit to a location server a request for information regarding access points; and
decode encoded access point identification data received in response to the request, the encoded access point identification data comprising:
a reference identifier comprising a number of groups of bits,
an encoding mask for an access point identifier, wherein the encoding mask identifies groups of bits for the access point identifier that are identical to corresponding groups of bits for the reference identifier, and
groups of bits of the access point identifier that are not identical to corresponding groups of bits for the reference identifier;
decode encoded locations received in response to the request, wherein the encoded locations are associated with encoded access point identifiers received in response to the request, wherein:
the request specifies a region; and
the encoded locations are located within the region and comprise encoded sets of coordinate values, wherein a respective encoded set of coordinate values comprises:
a single sequence of most significant bits common to every value of the set; and
sequences of least significant bits for respective values of the set, wherein the least significant bits are not common to every value of the set; and
the instructions to decode encoded access point identifiers comprise instructions to concatenate, for a respective coordinate value, the single sequence of most significant bits and a respective sequence of least significant bits.

16. The mobile device of claim 15, wherein the instructions to decode encoded access point identifiers comprise instructions to:
identify groups of bits of the access point identifier that are identical to corresponding groups of bits for the reference identifier, based at least in part on the respective encoding mask;
for the groups of bits of the access point identifier that are identified as identical to corresponding groups of bits for the reference identifier, use values of the corresponding groups of bits for the reference identifier; and
for the groups of bits of the access point identifier that are not identified as identical to corresponding groups of bits for the reference identifier, use values of the received groups of bits.

17. The mobile device of claim 15, wherein the groups of bits comprise nibbles.

18. The mobile device of claim 15, wherein:
the groups of bits are arranged in sets; and
the encoded access point identification data further comprise an encoding word for the access point identifier, wherein the encoding word identifies whether counts of how many groups of bits in respective sets of groups are identical to corresponding groups of bits in the reference identifier satisfy a criterion.

19. The mobile device of claim 18, wherein the encoded access point identification data does not include an encoding mask for a set in which the count does not satisfy the criterion.

20. The mobile device of claim 18, wherein:
the number of groups of bits is twelve nibbles; and
the sets comprise a first set of the six most significant nibbles and a second set of the six least significant nibbles.

21. The mobile device of claim 15, wherein the access point identifier comprises a basic service set identifier (BSSID).

22. The mobile device of claim 15, wherein the access point identifier comprises a media access control (MAC) address.

23. The mobile device of claim 15, wherein the reference identifier is an identifier of a first access point corresponding to the request.

24. The mobile device of claim 15, wherein the reference identifier is a synthetically constructed identifier.

25. The mobile device of claim 24, wherein respective groups of bits of the reference identifier have the most redundant values of corresponding groups of bits of access point identifiers corresponding to the request.

26. The method of claim 15, wherein the location server comprises an Access Point Location Server (APLS).

27. The method of claim 15, wherein the encoded sets of coordinate values comprise encoded sets of latitude values, encoded sets of longitude values, and encoded sets of altitude values.

28. The mobile device of claim 15, wherein the request specifies the access points.

29. A mobile device comprising:
means for transmitting to a location server a request for information regarding access points and for receiving a response to the request;
means for decoding encoded access point identification data received in the response, the encoded access point identification data comprising:
a reference identifier comprising a number of groups of bits,
an encoding mask for an access point identifier, wherein the encoding mask identifies groups of bits for the access point identifier that are identical to corresponding groups of bits for the reference identifier, and
groups of bits of the access point identifier that are not identical to corresponding groups of bits for the reference identifier, and
means for decoding encoded locations received in the response, wherein the encoded locations are associated with encoded access point identifiers received in the response and comprise encoded sets of coordinate values, a respective encoded set of coordinate values comprising:
a single sequence of most significant bits common to every value of the set; and
sequences of least significant bits for respective values of the set, wherein the least significant bits are not common to every value of the set; and
decoding the encoded locations comprises, for a respective coordinate value, concatenating the single sequence of most significant bits and a respective sequence of least significant bits.

* * * * *